United States Patent [19]

Overland et al.

[11] 4,333,041

[45] Jun. 1, 1982

[54] UNIVERSAL SIGNAL TRANSLATOR FOR MOTOR SPEED CONTROL

[75] Inventors: Donald L. Overland, Minneapolis; Glen A. Gauvin, Mound, both of Minn.

[73] Assignee: Detection Sciences, Inc., Minneapolis, Minn.

[21] Appl. No.: 143,910

[22] Filed: Apr. 25, 1980

[51] Int. Cl.³ .............................................. H02P 5/16
[52] U.S. Cl. ................................... 318/317; 318/327; 318/342; 318/341
[58] Field of Search ............... 318/442, 440, 317, 342, 318/344, 500, 341, 599, 326, 327; 307/265

[56] References Cited

U.S. PATENT DOCUMENTS

| | | | |
|---|---|---|---|
| 3,446,992 | 5/1969 | Webb | 307/265 |
| 3,714,470 | 1/1973 | Goldberg | 307/265 |
| 3,743,911 | 7/1973 | Erler | 307/265 |
| 3,906,319 | 9/1975 | Milligan | 318/327 |
| 3,912,994 | 10/1975 | Stovall | 318/342 |
| 3,978,384 | 8/1976 | Gucker | 318/317 |
| 4,024,445 | 5/1977 | Tokuda et al. | 318/341 |

*Primary Examiner*—David Smith, Jr.
*Attorney, Agent, or Firm*—Merchant, Gould, Smith, Edell, Welter & Schmidt

[57] ABSTRACT

A universal signal translator for use in a speed control system for connecting a speed controller producing speed command output signals having a first range of voltages or currents, to a motor speed regulator designed to operate on a second, different range of input control voltages from a control potentiometer. The signal translator can be connected between the speed controller and the motor speed regulator and will automatically couple control signals from the controller to the speed regulator while automatically accommodating a wide variety of control voltage ranges, without requiring any modifications or adjustments. The translator provides output signals to the regulator proportional to the speed command signals from the controller and automatically scaled to the appropriate voltage range of the regulator. This permits a standard universal signal translator to be used with a wide variety of different makes and models of speed regulators, without requiring expensive engineering modifications or redesign.

11 Claims, 4 Drawing Figures

UNIVERSAL SIGNAL TRANSLATOR FOR MOTOR SPEED CONTROL

BACKGROUND OF THE INVENTION

The present invention relates to a motor speed control system and in particular to a signal translator which enables a speed control generating output signals within a first range of voltages to be used with prior art speed regulators that operate from control signals within a second range of voltages, where the second range of voltages may vary from one model of speed regulator to another.

The prior art includes speed regulators that may operate as either AC or DC and may be SCR or AC inverter drives. Such prior art speed regulators typically include a potentiometer to which a reference potential is applied that is within a certain range of voltage, and where the voltage at the variable tap is used to regulate the motor speed. Such speed regulators are well-known and conventional and may have been operating in certain existing speed control systems for many years.

The prior art also includes speed controls, in particular digital speed controls, with a manual or automatic means for selecting a desired motor speed and means for generating an electrical signal corresponding to the selected speed. The prior art speed controls are provided with a feedback signal that is representative of the actual motor speed. The output of the speed control may fall within a range of voltages that is not compatible with the range of input control signal voltages of the speed regulator. Therefore, in order to incorporate the improved speed controls in prior art systems with conventional speed regulators as described above, one must completely redesign the motor speed control system or undertake extensive engineering modifications of the speed regulator such that it is compatible with the speed control. Since the prior art speed regulators and speed control systems are quite expensive there is reluctance to undertake such extensive rework or redesign.

The present invention solves this problem in the prior art by providing a signal translator which enables digital speed controls which operate in a first range of output signal voltages or currents to be used in combination with existing prior art speed regulators that operate within a second range of input control signal voltages, without need for any voltage scale adjustments or readjustments. The present invention thus permits the utilization of the improved and more efficient speed controls in existing motor speed control systems, without requiring expensive engineering modifications.

SUMMARY OF THE INVENTION

The present invention is a signal translator for use in a motor speed control system of the type including a speed controller that generates speed command signals to control the motor at a preselected speed and a motor speed regulator which provides controlled electrical energization to the motor to control the speed thereof, where the speed regulator also has a control potentiometer with terminals to which a reference potential is applied. The signal translator couples the speed controller to the speed regulator and includes an input means for receiving the reference potential from the potentiometer of the speed regulator, and a circuit means for receiving the speed command signal and the reference potential and for automatically generating an output signal proportional to said speed command signal and scaled to the range of the reference potential.

In the preferred embodiment, the signal translator further includes a means for electrically isolating the speed control from the speed regulator and the isolation means is further defined as electro-optical isolators.

The signal translator of the present invention thus generates an output signal within a range of voltage compatible with the speed regulator and which is proportional to the speed command signal of the speed control. Therefore conventional prior art motor speed control system can be converted to the state of the art digital speed controls utilizing the signal translator of the present invention. Such conversion can be accomplished with significantly less expense with the present invention because no system redesign and engineering is required. These and other advantages of the present invention will become apparent with reference to the accompanying drawings, detailed description of the preferred embodiment, and claims.

BRIEF DESCRIPTION OF THE DRAWING

FIG. 3 is a schematic diagram of the input section of the translator of FIG. 2.

DETAILED DESCRIPTION OF THE PREFERRED EMBODIMENT

Figure 1:
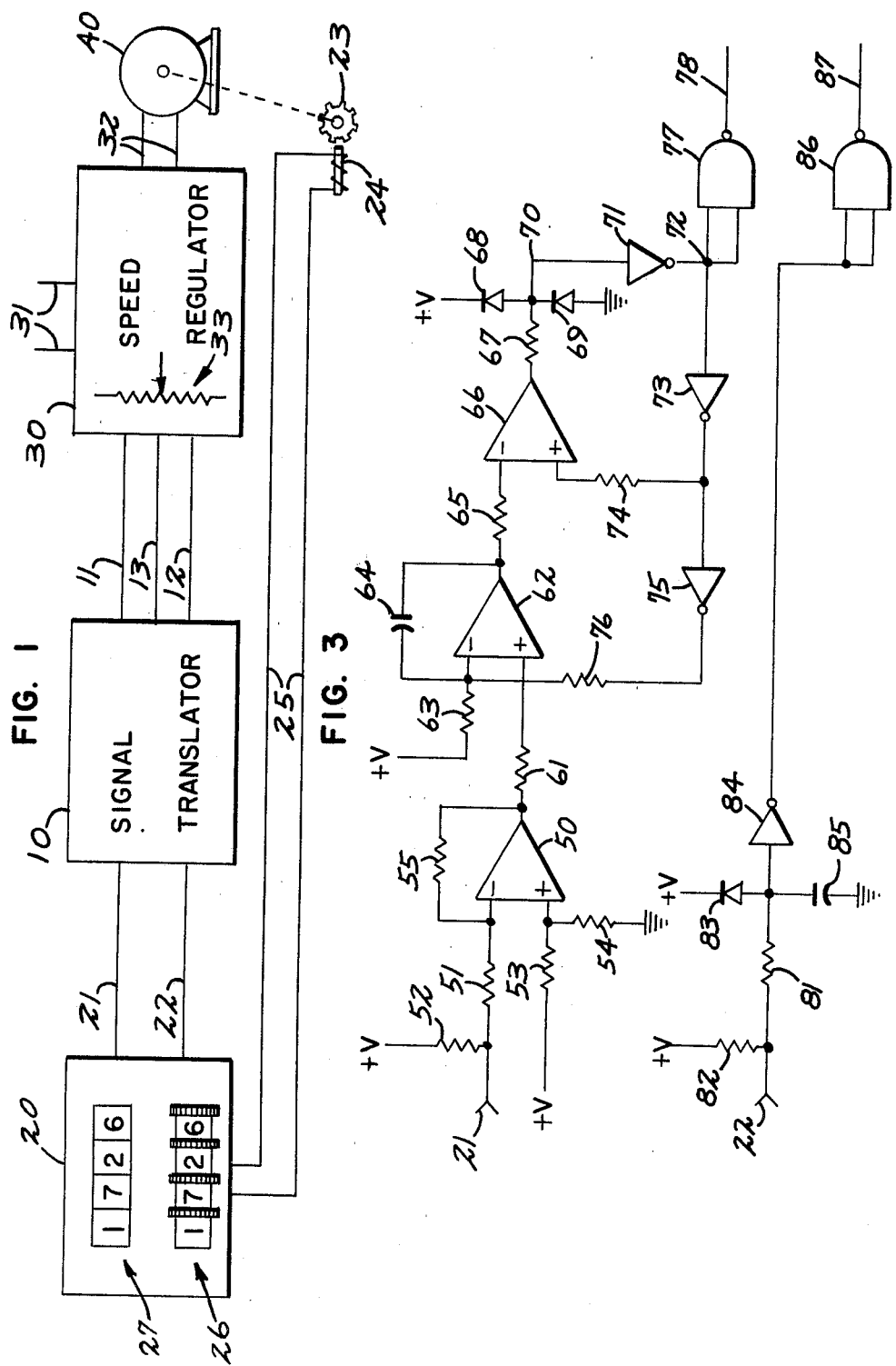
FIG. 1 is a block diagram showing the signal translator of the present invention connected in a complete speed control system.

FIG. 1, the universal signal translator of the present invention is shown connected in a typical electric motor speed control system. The signal translator is indicated by reference number 10. It receives inputs on control lines 21 and 22 from a speed controller indicated by reference number 20. Translator 10 provides output signals on control line 13 to a speed regulator or variable speed drive 30 which is connected for direct control of the speed of electric motor 40. Speed regulator 30 may be any type of AC or DC control device, such as an SCR drive or an AC inverter drive, subject to certain limitations discussed in greater detail below. Drives of this general class are well known in the art for receiving electric power on input buses 31 and for supplying controlled power on output buses 32 to the motor 40 to control the speed thereof.

The present invention is applicable for use with speed regulators of the type having a control potentiometer as indicated by reference number 33, the setting of which controls the speed of the motor. The circuit construction details of speed regulators 30 may be of any configuration for controlling the speed of the motor in response to the setting of a potentiometer, as are generally known, and are therefore not shown in detail. As pointed out in greater detail below, the signal translator of the present invention is designed to provide substitute signals replacing the potentiometer 33 of the speed regulator, to enable speed control 20 to ultimately control the speed of motor 40.

Motor 40, in addition to mechanically connecting to a machine or process for its intended use, coupled to a feedback device for sending signals indicative of motor speed to the speed controller. Any type of feedback device can be used, such as magnetic or optical devices, or tachometer-generators and the like. In the preferred embodiment a gear 23 is coupled to the motor and a magnetic pickup coil 24 is positioned adjacent tooth wheel 23 to sense passage of teeth as the motor turns, and to generate feedback pulses indicative thereof over leads 25 back to controller 20.

Controller 20 may be of any type, and may advantageously be a high accuracy digital type controller. Speed controller 20 generally has an input for receiving the desired command speed of the motor, and an input for receiving the feedback pulses from pickup 24. Of course in the case of a digital controller it is advantageous to have a pulse type feedback such as that provided by gear wheel 23 and pickup 24. However, analog feedback could also be used as is generally known in the art.

The input for the speed command is provided by a plurality of thumb wheel switches indicated by reference number 26. In the drawing, four digits are shown, with the illustrative example speed 172.6 shown thereon. A like number of digital readouts, indicated by reference number 27, are provided to show the actual measured speed of the motor. Scaling or programming facilities may be provided in speed controller 20 as described in U.S. Pat. No. 3,843,914 so that an appropriate scale factor can be provided for the commanded speed and speed display. In that manner the numbers do not have to correspond directly to rpm of the motor, but instead can be scaled in terms of some units of measure associated with the machine or process being driven by motor 40.

Regardless of the scale factor or units of measure, speed control 20 compares the set speed and the actual speed and provides a control signal on line 21 to speed or slow the motor as required to maintain the set speed. In the case of a reversible regulator and motor, a further control signal can be supplied on line 22 for forward or reverse command operation.

As mentioned above, certain difficulties are encountered in the prior art in coupling lead 21 from the speed control 20 directly to a speed regulator, unless both items were specifically designed or modified to work together. Where that is not the case, the translator 10 of the present invention can be connected between speed control 20 and regulator 30 to convey the necessary control to the speed regulator, but without requiring a special specific design or a modification to speed regulator 30. Coupler 10 achieves this control by essentially replacing the potentiometer 33 of the speed regulator. Lines 11 and 12 are connected to bring the "top" and "bottom" connections of potentiometer 33 to the translator, and line 13 delivers the appropriate control voltage, scaled in proportion to the voltage normally appearing across potentiometer 33, to drive the speed regulator. The translator 10 appears electrically just like potentiometer 33 as far as the remainder of the circuitry and speed regulator 30 is concerned. The only connection required to speed regulator 30 is connection of lines 11, 12, and 13. Translator 10 automatically compensates for variations in the current or voltage requirements of different speed regulators 30. For example, one type of regulator may operate its control potentiometer 33 between +10 volts and −10 volts, while another type of regulator may operate its control potentiometer 33 between 0 and 10 volts. Translator 10 may be connected to either such regulator, and will automatically compensate for the difference in voltage scale factor to allow control 20 to operate speed regulator 30 and motor 40 over its full design range.

This enables a standard speed control 20 and translator 10 to be used with a wide variety of existing speed regulators 30 of different make and design so that the existing speed regulators can be converted into a closed loop highly accurate speed control system with a minimum of cost.

Figure 2:
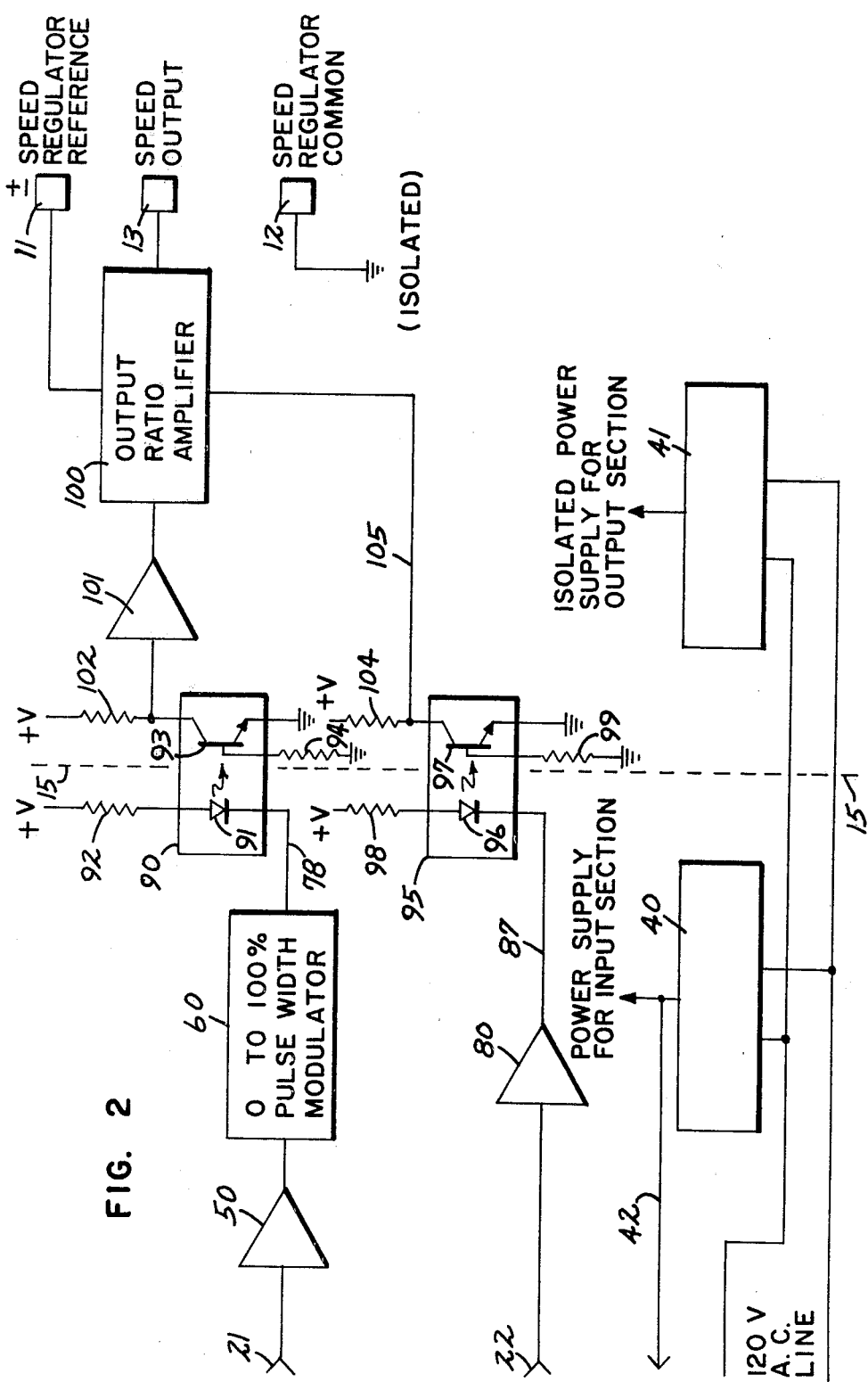
FIG. 2 is a block diagram of the signal translator of the present invention.
Figure 4:
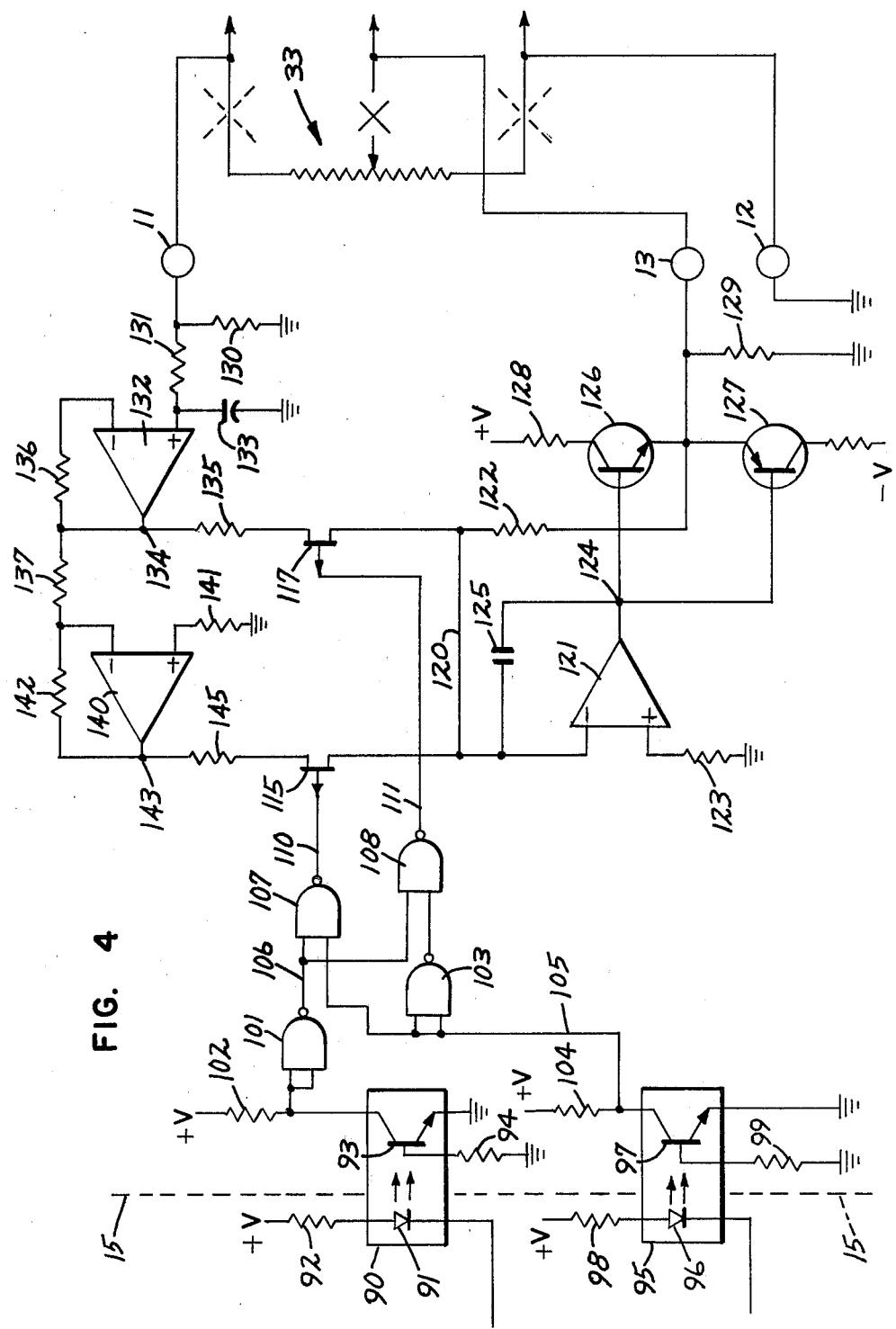
FIG. 4 is a schematic diagram of the output section of the signal translator of FIG. 2.

Referring to FIG. 2, translator 10 is shown in greater detail. In FIG. 2, a dotted line 15 shows the separation of translator 10 into an input section and an isolated output section. Separate power supplies 40 and 41 are provided for supplying the operating DC voltages for the circuitry in the two sections. For convenience, the voltages from power supply 40 can operate both the input section electronics, and via branch 42, it can operate the electronics in speed control 20, assuming that speed control 20 and translator 10 are designed to work together. In FIGS. 2, 3, and 4, the specific connections of power supplies 40 and 41 to the various circuits are omitted for purposes of clarity. However, it will be understood that where a particular circuit is shown as being connected to +V or signal ground, those connections refer to one of power supplies 40 or 41, depending upon whether the particular circuit is in the input section or output section.

In FIG. 2, line 21, which comes from the speed control, connects to an amplifier 50, and the output of the amplifier connects to a pulse width modulator 60. The output of modulator 60 connects via lead 78 to an optical isolator 90. More specifically, lead 78 connects to the cathode of a light emitting diode 91 therein. The anode of LED 91 connects through current limiting resistor 92 to the plus power supply for the input section. Optical isolator 90 also includes a phototransistor 93 which is optically coupled to receive light from LED 91. Phototransistor 93 connects to the output section as described more fully below. The other input 22 from the digital speed control conveys the forward/reverse information for controlling motor direction, where applicable. It connects through an amplifier 80 to a lead 86 which connects to the cathode of an LED 96 in a second optical isolator 95. The anode of LED 96 connects through current limiting resistor 98 to the plus voltage supply. Phototransistor 97 is included within optical isolator 95, in optical communication with LED 96.

In the output section of FIG. 2, an output ratio amplifier 100, which is described in more detail below with respect to FIG. 4, receives the inputs from both optical isolators 90 and 95. Specifically, the collector of phototransistor 93 connects through an amplifier 101 as one input to output ratio amplifier 100. The collector of phototransistor 93 also connects through a pull-up resistor 102 to the +V power supply for the output section, reference 41. Bias resistor 94 connects from the base of phototransistor 93 to signal ground.

The collector of phototransistor 97 connects to lead 105 and also through a bias resistor 104 to the +V power supply. The base of phototransistor 97 connects through resistor 99 to ground. Lead 105 connects as another input to output ratio amplifier 100.

The outputs of ratio amplifier 100, at leads 11 and 13 plus the isolated ground 12, are to be connected to the leads of the speed regulator originally connected to control potentiometer 33 (FIG. 1). In practice, a connecting wire from the low or ground side of potentiometer 33 is connected to lead 12. A wire is run from the high or reference voltage side of potentiometer 33 to terminal 11. The existing connection within speed regulator 30 to the wiper or movable tap of potentiometer 33 is disconnected from the potentiometer, and instead is connected to lead 13. Output amplifier 100 appears electrically to be the same as potentiometer 33, as far as the remainder of the circuit of regulator 30 is concerned. However, output amplifier 100 is variable, or controllable from the speed control so that automatic speed regulation of the motor can take place. Since output ratio amplifier 100 simulates, or replaces the existing control potentiometer of the speed regulator, it can be thought of as an active potentiometer, which operates under control of the speed control.

Referring to FIG. 3, the input section of the preferred embodiment of signal translator 10 is shown in greater detail. The input from line 21 connects through resistor 51 to the inverting input of an operational amplifier 50. Lead 21 also connects through a bias resistor 52 to the +V supply for the input section. A bias is applied to the non-inverting input of amplifier 50 by resistors 53 and 54 and their connections to the voltage source and signal ground as shown. A feedback resistor 55 connects from the output to the inverting input of amplifier 50.

The output of amplifier 50 connects through resistor 61 to the non-inverting input of an operational amplifier 62. The inverting input of amplifier 62 is connected receives signals from resistor 63, the other end of which connects to +V; from a resistor 76, and from a feedback capacitor 64, the other side of which connects from the output of amplifier 62.

The output of amplifier 62 connects through resistor 65 to the inverting input of a further amplifier 66, the output of which connects through resistor 67 to lead 70. A pair of diodes 68 and 69 connect from lead 70 to +V and signal ground, respectively, and serve to clip or limit the magnitude of signals at that point. Lead 70 connects through an inverter 71 to lead 72. A gate 77, which is used as a digital signal amplifier/inverter has both its inputs connected to lead 72, and its output connected to lead 78. A branch of lead 72 connects to inverter 73, and its output connects to a resistor 74 and to the input of a further inverter 75. The other side of resistor 74 connects to the non-inverting input of amplifier 66. The output of inverter 75 connects to resistor 76, the other side of which connects to the inverting input of amplifier 62.

The forward or reverse control signal at lead 22 connects to resistors 81 and 82. The other side of resistor 82 is connected to the +V source, while the other side of resistor 81 connects to the input of an inverter-amplifier 84. Also connected to the input of inverter 84 are a capacitor 85, the other side of which connects to signal ground, and a diode 83, whose cathode connects to +V. The output of amplifier 84 connects to both inputs of a logic gate 86, which is connected for use as a digital signal amplifier and inverter. The output of gate 86 appears at lead 87.

Referring now to FIG. 4, the output section of a preferred embodiment of signal translator 10 is shown in greater detail. The collector of phototransistor 93 connects to both inputs of a logic gate 101, which is used in this application as a digital signal amplifier/inverter. Similarly, the collector of phototransistor 97 connects via lead 105 to both inputs of a logic gate 103, used in this application as a digital signal amplifier/inverter. The output of gate 101, on lead 106, connects to one input of gate 107, and a branch of lead 106 connects to one input of a gate 108. A branch of lead 105 connects to the second input of gate 107, and the output of gate 103 connects to the second input of gate 108.

A pair of field effect transistors 115 and 117 are provided for use as analog switches. In the preferred embodiment these components are on a commercially available integrated circuit. The output of gate 107 is applied via lead 110 to the gate of FET 115, and similarly the output of gate 108 is connected via lead 111 to the gate of FET 117. The drain electrodes of FET's 115 and 117 are connected together at lead 120, a branch of which connects to the inverting input of amplifier 121. Another branch of lead 120 connects through resistor 122 to the speed output terminal and lead 13.

The non-inverting input of amplifier 121 connects through resistor 23 to signal ground. The output of amplifier 121 connects to lead 124, a branch of which connects through feedback capacitor 125 to the non-inverting input. Other branches of lead 124 connect to the bases of a pair of output transistors 126 and 127. Transistor 126 is a NPN type with its emitter connected to output lead 13 and its collector connected through resistor 128 to the +V supply. Transistor 127 is a PNP type, with its emitter connected to lead 13 and its collector connected to the −V power supply of the output section. A load resistor 129 connects from output lead 13 to signal ground.

Terminal 11 connects through a load resistor 130 to signal ground. Load resistor 130 typically would have a very high value, for example one megohm. Terminal 11 also connects through resistor 131 to the non-inverting input of an amplifier 132. An integrating or filtering capacitor also connects to the non-inverting input, and its other side connects to signal ground. The output of amplifier 132 is connected to lead 134. Resistor 135 connects from lead 134 to the source electrode of FET 117, and to the anode of diode 118. The cathodes of both diodes 118 and 116 connect to signal ground. A branch of lead 134 connects to feedback resistor 136, the other side of which connects to the inverting input of amplifier 132. A branch of lead 134 also connects through resistor 137 to the inverting input of amplifier 140, the non-inverting input of which is connected by resistor 141 to signal ground. Feedback resistor 142 connects between the output of amplifier 140, at lead 143, and its inverting input. A branch of lead 143 connects through resistor 145 to the source electrode of FET 115 and the anode of diode 116.

The speed regulator is connected to the output of the translator as shown in FIG. 4. The reference voltage for the control potentiometer 33 is connected to terminals 11 and 12. It is usually not necessary to break their original connections to the potentiometer terminals, but it can be done it desired, as indicated by the dotted-line X's. The existing line to the potentiometer variable tap is broken as indicated by the X, and is re-connected to terminal 13.

The operation of the invention will now be described. Speed control 20 provides a variable current sinking signal at lead 21, and the voltage signal thus generated across resistor 52 (FIG. 3) is applied to differential amplifier 50, which may provide some gain, or which may have unity gain and provide primarily a buffering function. An analog voltage is provided at the output of amplifier 50, the magnitude of which is dependent upon the speed commands being generated by the speed controller.

The circuitry associated with amplifiers 62 and 66 and inverters 71, 73, and 75 functions as a pulse width modulator. This circuit generates a train of pulses applied through gate 77 and lead 78 to LED 91. The duty cycle of this pulse train, i.e., the ratio of on time to off time is varied or modulated according to the control voltage at the output of amplifier 50. In that manner the percentage of on time of the light pulses generated by LED 91 is variable or controllable between 0% (completely off) and 100% (constantly on) with intermediate values, such as 50%, representing equal on and off times.

The control signal on line 22 is a digital on or off signal to indicate a desired forward or reverse direction for motor 40. Resistor 82 serves as the bias or pull-up resistor for the switching function taking place within controller 20, and the digital signal at lead 22 is passed through inverter 84 and amplifier/inverter 86 to LED 96, which is either on or off, depending upon the applied digital control signal.

Referring to FIG. 4, the forward/reverse control signal as transmitted through optical isolator 95 in the form of the presence or absence of a light signal, causes transistor 97 to turn on or off accordingly. The switching signal thus generated at lead 105 either enables or inhibits gate 107. At the same time, the control signal at lead 105 is inverted by gate 103 and is used to inhibit or enable gate 108. Gates 107 and 108 are thus out of phase in that one is enabled when the other is inhibited, and vice versa.

The pulse width modulated signal for the speed control is transmitted from LED 91 to the phototransistor 93, causing it to turn off and on accordingly. The pulse width modulated digital signal is then transmitted from the collector of phototransistor 93, through inverter gate 101 to lead 106 and to inputs of both gates 107 and 108. Depending upon which one of gates 107 or 108 is enabled, the pulse width modulated signal will be applied either on lead 110 to FET 115, or on lead 111 to FET 117.

Referring now to terminal 11, the voltage applied there will be the reference voltage originally applied to the existing potentiometer 33 of the speed regulator. In the preferred embodiment resistors 131, 136, 137 and 142 are chosen to give amplifiers 132 and 140 unity gain. The voltage at terminal 11 will therefore appear at lead 134, with amplifier 132 acting as a buffer. The voltage at lead 134 is inverted by amplifier 140, and the voltage at lead 143 is thus equal in magnitude but opposite in polarity to the voltage at lead 134. Amplifier 132 thus acts as a buffer while amplifier 140 acts as an inverter. If gate 108 is enabled, the reference voltage at lead 134 (which equals the reference voltage at terminal 11) is applied through input resistor 135 and FET 117 to the inverting input of amplifier 121. If gate 107 is enabled, the voltage at lead 143 (which is the reverse polarity of the reference voltage at terminal 11) is applied through input resistor 135 and FET 115 to the inverting input of amplifier 121. Whichever of these voltages is applied, it will be appreciated that the applied voltage is pulse width modulated by virtue of the pulse width modulated control signal transmitted through optical isolator 90, gates 101 and either 107 or 108.

Thus, the signal applied to the input of amplifier 121 is a pulse type signal having a modulated pulse width corresponding to the speed command, and having a voltage magnitude which is scaled in proportion to whatever voltage reference is applied to terminal 11 from the existing circuits within the speed regulator (of course within limits as to the maximum power supply voltages applied to amplifiers 132 and 140). Further, the polarity of the signal applied to the inverting input of amplifier 121 is a function of the forward/reverse control signal transmitted through isolator 95.

The pulse width modulated signal is demodulated through the integrating action of amplifier 121 and associated components, so that the output signal at terminal 13 is a smoothed analog voltage proportional in magnitude both to the original control signal from speed control 20, and also to the scale of whatever the voltage reference may be from the speed regulator 30. As an example to illustrate the operation of the signal translator of the present invention, assume for illustrative purposes that the current or voltage signal at lead 21 is at the mid-point of its range. The output voltage at terminal 13 would therefore also be at the mid-point of the range between the voltages at terminals 11 and 12. However, the actual magnitude of the voltage will be a function of the reference voltage originally across the potentiometer 33 of the speed regulator, and may vary from one regulator model to another. In this example if the voltage at lead 11 was 15 volts and the voltage at lead 12 was signal ground, then the voltage at lead 13 would be $7\frac{1}{2}$ volts. If the voltage across the potentiometer was $+10$ volts and $-5$ volts with reference to signal ground within the speed regulator then the voltage at lead 13 would be $+2\frac{1}{2}$ volts with reference to the signal ground of the speed regulator. In that manner the signal translator provides the required proportional control voltage which is automatically scaled in value according to the voltage reference used within the speed regulator, without requiring any custom design or circuit modifications either to the signal translator or the speed regulator other than the simple hookup to the potentiometer input of the speed regulator.

It will thus be seen that according to the present invention we have provided a signal translator for use in a speed control system to enable a speed control to be connected to an existing AC or DC speed regulator or variable speed drive of the type operating from a control potentiometer, without the need for custom engineering or circuit modifications to adapt the speed control to the particular voltage reference that may be used within the existing speed regulator. This permits a simplified standardized high performance unit to be offered at reasonable cost so that engineering costs for modifications or custom design can be avoided.

What is claimed is:

1. A signal translator for use in a motor speed control system of the type including a speed controller for generating speed command signals to control the motor at a preselected speed, and a motor speed regulator which provides controlled electrical energization to the motor to control the speed thereof, the speed regulator including a control potentiometer with terminals to which a reference potential is applied, said signal translator for coupling the speed controller to the speed regulator, said signal translator comprising:

input means for receiving a speed command signal from the speed controller;

terminal means for receiving the reference potential from the speed regulator; and circuit means connected to receive said speed command signal and said reference potential and operative for generating a DC non-pulsed output signal having a voltage proportional to the magnitude of said speed command signal and proportional to the range of the reference potential, the output signal for connection to the speed regulator in place of the output of the control potentiometer.

2. A signal translator for use in a motor speed control system of the type including a speed regulator having an input operating within a range of voltage, a speed controller with first input means for selecting a motor speed, second input means for receiving a motor speed feedback signal representative of the actual motor speed, and output means generating a speed command signal, said signal translator comprising:
   (a) input means for connection to the output means of the speed controller for receiving the speed command signal;
   (b) output means for connection to said speed regulator; and
   (c) means for generating a DC non-pulsed control signal within said proportional to said range of voltage and having a voltage proportional to the magnitude of said speed command signal, and means applying said control signal to said output means, whereby the control signal controls the motor speed in response to the speed command signal.

3. A signal translator in accordance with claim 2 further comprising means for electrically isolating the speed regulator from the speed control.

4. A signal translator in accordance with claim 2 wherein the speed regulator includes a potentiometer to which a reference potential is applied and wherein said signal translator further comprises terminal means for receiving said reference potential.

5. A motor speed control system comprising:
   (a) a speed regulator for delivering electrical excitation to the motor to control the speed thereof in response to a a motor speed control signal within a range of voltage determined by a reference potential within the speed regulator;
   (b) a speed control with first input means for selecting desired speed, second input means for receiving a feedback signal corresponding to the actual motor speed, and output means for generating a speed command signal;
   (c) a signal translator with an input connected to said output means of said speed control, reference input means for receiving said reference potential from said speed regulator, means for generating a DC non-pulsed control signal having a voltage within and proportional to said range of voltage and proportional to the magnitude of said speed command signal, and an output means connected to said speed regulator for applying said control signal thereto; and
   (d) feedback means connected to said second input means of said speed control for providing said feedback signal.

6. A motor speed control system in accordance with claim 5 wherein said speed regulator includes a potentiometer to which said reference potential is applied and to which said reference input means of said signal translator is connected.

7. A motor speed control system in accordance with claim 5 wherein said signal translator further comprises means for electrically isolating said speed control from said speed regulator.

8. A motor speed control system in accordance with claim 7 wherein said electrical isolation means further comprises electro-optical isolators.

9. A signal translator in accordance with claim 2 further comprising means responsive to a direction signal from said speed controller for determining the polarity of said control signal, whereby the direction of the motor is controlled.

10. A signal translator for interfacing a motor speed regulator having a control potentiometer with a speed controller having an analog current output for control of motor speed, said signal translator comprising:
    (a) means responsive to a range of current inputs from the speed controller for modulating the duty cycle of a square wave in proportion to the magnitude of said input current;
    (b) means for demodulating the square wave to a proportionate DC voltage signal;
    (c) isolating means connected for transmitting the modulated square wave from said responsive means to said demodulating means without DC coupling; and
    (d) scaling means connected to said demodulating means and having an input for a reference voltage, said scaling means responsive to said DC voltage signal for generating a non-pulsed DC signal having a voltage within and proportional to the range of said reference voltage and proportionate to said DC voltage signal.

11. A signal translator according to claim 10 wherein said isolating means includes optical coupling isolators.

* * * * *

UNITED STATES PATENT AND TRADEMARK OFFICE
CERTIFICATE OF CORRECTION

PATENT NO. : 4,333,041
DATED : June 1, 1982
INVENTOR(S) : Donald L. Overland et al It is certified that error appears in the above–identified patent and that said Letters Patent are hereby corrected as shown below:

Column 9, line 19, "said", first occurrence, should be --and--.

Signed and Sealed this

Fourteenth Day of December 1982

[SEAL]

Attest:

Attesting Officer

GERALD J. MOSSINGHOFF

Commissioner of Patents and Trademarks